(12) United States Patent
Eichenberger et al.

(10) Patent No.: US 8,549,501 B2
(45) Date of Patent: Oct. 1, 2013

(54) FRAMEWORK FOR GENERATING MIXED-MODE OPERATIONS IN LOOP-LEVEL SIMDIZATION

(75) Inventors: Alexandre E. Eichenberger, Chappaqua, NY (US); Kai-Ting Amy Wang, North York (CA); Peng Wu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 2416 days.

(21) Appl. No.: 10/919,005

(22) Filed: Aug. 16, 2004

(65) Prior Publication Data

US 2005/0273769 A1    Dec. 8, 2005

Related U.S. Application Data

(63) Continuation-in-part of application No. 10/862,483, filed on Jun. 7, 2004, now Pat. No. 7,386,842.

(51) Int. Cl.
*G06F 9/45* (2006.01)

(52) U.S. Cl.
USPC .......................................... 717/150; 717/160

(58) Field of Classification Search
USPC .............................. 712/21, 22; 717/150–161
See application file for complete search history.

(56) References Cited

U.S. PATENT DOCUMENTS

| | | | |
|---|---|---|---|
| 4,710,872 A | 12/1987 | Scarborough | 717/160 |
| 5,247,645 A | 9/1993 | Mirza et al. | 711/5 |
| 5,349,665 A | 9/1994 | Endo | 717/160 |
| 5,440,687 A | 8/1995 | Coleman et al. | 709/236 |
| 5,481,746 A | 1/1996 | Schiffleger et al. | 712/7 |
| 5,522,074 A | 5/1996 | Endo | 717/150 |
| 5,802,375 A | 9/1998 | Ngo et al. | 717/160 |
| 5,933,650 A | 8/1999 | van Hook et al. | 712/2 |
| 5,996,057 A | 11/1999 | Scales, III et al. | 712/5 |
| 6,113,650 A | 9/2000 | Sakai | 717/160 |
| 6,202,141 B1 | 3/2001 | Diefendorff et al. | 712/9 |
| 6,266,758 B1 | 7/2001 | van Hook et al. | 712/2 |
| 6,334,176 B1 | 12/2001 | Scales, III et al. | 712/4 |
| 6,484,255 B1 | 11/2002 | Dulong | 712/224 |
| 6,550,059 B1 | 4/2003 | Choe et al. | 717/159 |

(Continued)

OTHER PUBLICATIONS

Scarborough et al., "A Vectorizing Fortran Compiler", Mar. 1986, IBM Journal of Research and Development, vol. 30, Issue 2, pp. 163-171.*

(Continued)

*Primary Examiner* — Chat Do
*Assistant Examiner* — Jue Wang
(74) *Attorney, Agent, or Firm* — VanLeeuwen & VanLeeuwen; Matthew B. Talpis

(57) ABSTRACT

Generating mixed-mode operations in the compilation of program code for processors having vector or SIMD processing units is disclosed. In a preferred embodiment of the present invention, program instructions making up the body of a loop are abstracted into virtual vector instructions. These virtual vector instructions are treated, for initial code optimization purposes, as vector instructions (i.e., instructions written for the vector unit). The virtual vector instructions are eventually expanded into native code for the target processor, at which time a determination is made for each virtual vector instruction as to whether to expand the virtual vector instruction into native vector instructions, into native scalar instructions, into calls to pre-defined library functions, or into a combination of these. A cost model is used to determine the optimal choice of expansion based on hardware/software constraints, performance costs/benefits, and other criteria.

19 Claims, 14 Drawing Sheets

(56) References Cited

U.S. PATENT DOCUMENTS

| | | | | |
|---|---|---|---|---|
| 7,020,873 | B2 | 3/2006 | Bik et al. | 717/156 |
| 7,168,069 | B1 | 1/2007 | Sigmund | 717/140 |
| 7,219,212 | B1 | 5/2007 | Sanghavi et al. | 712/6 |
| 7,275,147 | B2 | 9/2007 | Tavares | 712/224 |
| 2003/0120889 | A1 | 6/2003 | Roussel et al. | 711/201 |
| 2003/0167460 | A1 | 9/2003 | Desai et al. | 717/151 |
| 2003/0204840 | A1 | 10/2003 | Wu | 717/158 |
| 2004/0001066 | A1 | 1/2004 | Bik et al. | 345/505 |
| 2004/0003381 | A1 | 1/2004 | Suzuki et al. | 717/150 |
| 2004/0006667 | A1 | 1/2004 | Bik et al. | 711/100 |
| 2004/0025150 | A1 | 2/2004 | Heishi et al. | 717/154 |
| 2004/0098709 | A1* | 5/2004 | Kyo | 717/140 |
| 2005/0097301 | A1 | 5/2005 | Ben-David et al. | 712/22 |
| 2005/0289529 | A1 | 12/2005 | Almog et al. | 717/158 |

OTHER PUBLICATIONS

Levine et al., "A Comparative Study of Automatic Vectorizing Compilers", 1991, Parallel Computing, vol. 17.*

Larsen et al. "Exploiting Superword Level Parallelism with Multimedia Instruction Sets", 2000, PLDI 2000, pp. 145-156.*

Lorenz et al. "Energy Aware Compilation for DSPs with SMID Instructions", 2002, LCTES'02-SCOPES'02, pp. 94-101.*

Bik et al., "Efficient Exploitation of Parallelism on Pentium III and Pentium 4 Processor-Based Systems", 2001, Intel Technology Journal Q1, 2001.*

Schouten et al. "Inside the Intel Compiler", Feb. 2003, Linux Journal, vol. 2003, Issue 106.*

Lee et al., "Simple Vector Microprocessors for Multimedia Applications," *Preceedings of the 31st Annual International Symposium on Microarchitecture*, Dec. 1998 (12 pages).

Cheong et al., "An Optimizer for Multimedia Instruction Sets," Stanford University, Aug. 14, 1997.

Krall et al., "Compilation Techniques for Multimedia Processors," 14 pages.

Sreraman et al., "A Vectorizing Compiler for Multimedia Extensions," *International Journal of Parallel Programming*, 2000 (40 pages).

Bik et al., "Automatic Intra-Register Vectorizatoin for the Intel Architecture," *International Journal of Parallel Programming*, vol. 30, No. 2, Apr. 2002 (p. 65-98).

O'Brien, "Predictive Commoning: A method of optimizing loops containing references to consecutive array elements," 12 pages.

Larsen et al., "Increasing and Detecting on Parallel Memory Address Congruence," *Proceedings of 11th International Conference on Parallel Architectures and Compilation Techniques*, Sep. 2002, 11 pages.

Naishlos, "Vectorizing for a SIMdD DSP Architecture," *Cases '03*, Oct. 30-Nov. 1, 2003, *ACM*, pp. 2-11.

Shin et al., "Compiler-Controlled Caching in Superword Register Files for Multimedia Extension Architectures," 11 pages.

Ren et al., "A Preliminary Study on the Vectorization of Multimedia Applications for Multimedia Extensions," 15 pages.

Eichenberger et al., Vectorization for SIMD Architectures with Alignment Constraints, *PLDI'04*, Jun. 9-11, 2004, p. 82-83.

Chatterjee et al., "Modeling Data-Parallel Programs with the Alignment-Distribution Graph," *6th Annual Workshop on Languages and Compilers for Parallelism*, Aug. 1993, 28 pages.

Allen et al., "Automatic Translation of FORTRAN Programs to Vector Form," *ACM Transactions on Programming Languages and Systems*, v. 9, No. 4, Oct. 1987, p. 491-542.

*AltiVec™ Technology Programming Interface Manual*, 1999, 262 pages.

Arafeh et al., "Vectorization and Parallelization Interactive Assistant," 1988, ACM 0-89791-260-8/88/0002/0573, pp. 573-577.

McKenney et al., "Generating Parallel Code for SIMD Machines," ACM Letters on Programming Languages and Systems, vol. 1, No. 1, Jan. 1992, pp. 59-73.

Pajuelo et al., "Speculative Dynamic Vectorization," 2002, IEEE 1063-6897/02, pp. 271-280.

Naishlos et al., "Vectorizing for a SIMdD DSP Architecture," CASES '03, Oct. 30-Nov. 1, 2003, ACM 1-58113-676-5/03/0010, pp. 2-11.

Cukic et al., "Automatic Array Alignment as a Step in Hierarchical Program Transformation," Apr. 1994, Proceedings of the Eighth International Parallel Processing Symposium.

Lee et al., "Automatic Data and Computation Decomposition on Distributed Memory Parallel Computers," Jan. 2002, ACM Transactions on Programming Languages and Systems, vol. 24, No. 1, pp. 1-50.

\* cited by examiner

```
for (i = 0; i < 100; i++) {
   a[i+3] = b[i+1] + c[i+2];
}
```

*Figure 1*

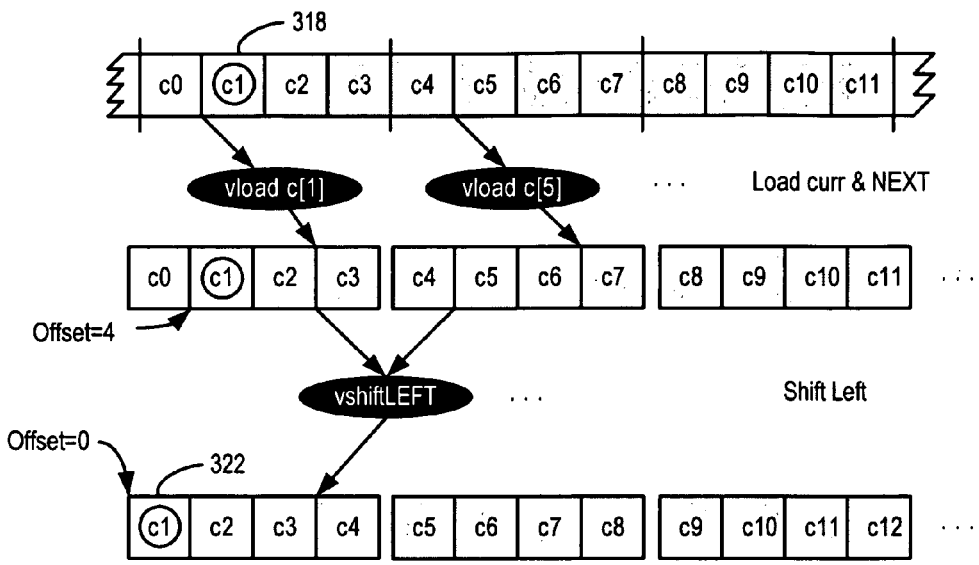

Figure 3D

NormalizeStream(n)

1  if $n \equiv \text{VSTORE}(addr(i), src)$
2     return VSTORE(NormalizeStream(src))
3  if $n \equiv \text{VLOAD}(addr(i))$ return VLOAD(addr(i))
4  if $n \equiv \text{VSTREAMSHIFT}(src, to)$
5     $src' \leftarrow$ PrependStream(src, to)
6     return VSHIFTSTREAM(NormalizeStream(src'), 0)
7  if $n \equiv \text{VOP}(src_1, \ldots, src_n)$
8     for $(k = 1..n)$ $src'_k \leftarrow$ NormalizeStream($src_k$)
9     return VOP($src'_1, \ldots, src'_n$)

PrependStream(n,x)

10 if $n \equiv \text{VLOAD}(addr(i))$
11    return VLOAD(addr(i) − x)
12 if $n \equiv \text{VOP}(src_1, \ldots, src_n)$
13    return VOP(PrependStream($src_1, x$), \ldots, PrependStream($src_n, x$))
14 if $n \equiv \text{VSHIFTSTREAM}(src, to)$
15    return VSHIFTSTREAM(PrependStream(src, x), (to − x) mod V)

Figure 4

```
int a[256], b[256];
double m[256], n[256];
int x[256], y[256];                812
for(int i=0; i<n; i++) {
    a[i] = x[i] + y[i];
    m[i] = m[i] * n[i];
    b[i] = n;                          800
}                                  802
                               804
```

```
for(int i=0; i<n; i++) {                812
    a[i..i] = x[i..i] ADD y[i..i];
    m[i..i] = x[i..i] MUL n[i..i];       806
    b[i..i] = LOD n;
}                                   810    808
```

Figure 8B

```
for(int i=0; i<n; i+=4) {               814
    a[i..i+3] = x[i..i+3] ADD y[i..i+3];
    m[i..i+3] = x[i..i+3] MUL n[i..i+3];  816
    b[i..i+3] = LOD n;
}                                   820    818
```

Figure 8C

```
for(int i=0; i<n; i+=4) {                            822
    a[i..i+3] = vec_add(x[i+0..i+3], y[i..i+4]);
    m[i]   = m[i]   * n[i];
    m[i+1] = m[i+1] * n[i+1];       824
    m[i+2] = m[i+2] * n[i+2];
    m[i+3] = m[i+3] * n[i+3];
    b[i..i+3] = vec_splat(vec_lde(&n,0),0);
}                                                    826
```

Figure 8D ns in the instruction. The same applies to store instructions. In this paper, architectures with alignment constraints refer to machines that support only loads and stores of register-length aligned memory.

FRAMEWORK FOR GENERATING MIXED-MODE OPERATIONS IN LOOP-LEVEL SIMDIZATION

CROSS-REFERENCE TO RELATED APPLICATIONS

This application is a continuation-in-part of commonly assigned, U.S. Non-Provisional patent application Ser. No. 10/862,483, entitled "SYSTEM AND METHOD FOR EFFICIENT DATA REORGANIZATION TO SATISFY DATA ALIGNMENT CONSTRAINTS," filing date Jun. 7, 2004 now U.S. Pat. No. 7,386,842, which is incorporated herein by reference. This application is also related to U.S. Non-Provisional patent application Ser. No. 10/919,131, entitled "SYSTEM AND METHOD FOR SIMD CODE GENERATION FOR LOOPS WITH MIXED DATA LENGTHS,"; U.S. Non-Provisional patent application Ser. No. 10/918,879 entitled "FRAMEWORK FOR EFFICIENT CODE GENERATION USING LOOP PEELING FOR SIMD LOOP CODE WITH MULTIPLE MISALIGNED STATEMENTS,"; U.S. Non-Provisional patent application Ser. No. 10/919,115, entitled "FRAMEWORK FOR INTEGRATED INTRA- AND INTER-LOOP AGGREGATION OF CONTIGUOUS MEMORY ACCESSES FOR SIMD VECTORIZATION,"; and U.S. Non-Provisional patent application Ser. No. 10/918, 996, entitled "SYSTEM AND METHOD FOR SIMD CODE GENERATION IN THE PRESENCE OF OPTIMIZED MISALIGNED DATA REORGANIZATION,", which are all filed even date hereof, assigned to the same assignee, and incorporated herein by reference.

BACKGROUND OF THE INVENTION

1. Technical Field

The present invention relates in general to a system and method for vectorizing loop code for execution on Single Instruction Multiple Datapath (SIMD) architectures that impose strict alignment constraints on the data.

2. Description of the Related Art

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. See, e.g., REN, Gang, et al. A Preliminary Study on the Vectorization of Multimedia Applications. In 16th International *Workshop of Languages and Compilers for Parallel Computing*. October 2003. To distinguish between the two types of vectorization, we refer to the latter as simdization. One such fundamental difference comes from the memory unit. The memory unit of a typical SIMD processor bears more resemblance to that of a wide scalar processor than to that of a traditional vector processor. In the ALTIVEC instruction set found on certain POWERPC microprocessors (produced by International Business Machines Corporation and Motorola, Inc.), for example, a load instruction loads 16-byte contiguous memory from 16-byte aligned memory, ignoring the last 4 bits of the memory address in the instruction. The same applies to store instructions. In this paper, architectures with alignment constraints refer to machines that support only loads and stores of register-length aligned memory.

There has been a recent spike of interest in compiler techniques to automatically extract SIMD parallelism from programs. See, e.g., LARSEN, Samuel, et al. Exploiting Superword Level Parallelism with Multimedia Instruction Sets. In *Proceedings of SIGPLAN Conference on Programming Language Design and Implementation*. June 2000, pp. 145-156; BIK, Aart, et al. Automatic Intra-Register Vectorization for the Intel Architecture. *Int. J. of Parallel Programming*. April 2002, vol. 30, no. 2, pp. 65-98; KRALL, Andreas, et al. Compilation Techniques for Multimedia Processors. *Int. J. of Parallel Programming*. August 2000, vol. 28, no. 4, pp. 347-361; SRERAMAN, N., et al. A Vectorizing Compiler for Multimedia Extensions. *Int. J. of Parallel Programming*, August 2000, vol. 28, no. 4, pp. 363-400; LEE, Corinna G., et al. Simple Vector Microprocessors for Multimedia Applications. In *Proceedings of International Symposium on Microarchitecture*. 1998, pp. 25-36; and NAISHLOS, Dorit, et al. Vectorizing for a SIMD DSP Architecture. In Proceedings of *International Conference on Compilers, Architectures, and Synthesis for Embedded Systems*. October 2003, pp. 2-11. This upsurge was driven by the increasing prevalence of SIMD architectures in multimedia processors. Two principal techniques have been used, the traditional loop-based vectorization pioneered for vector supercomputers (e.g., ALLEN, John Randal, et al. Automatic Translation of Fortran Programs to Vector Form. *ACM Transactions on Programming Languages and Systems*. October 1987, vol. 4, pp. 491-542; and ZIMA, Hans, et al. Supercompilers for Parallel and Vector Computers. Reading, Mass.: Addison-Wesley/ACM Press, 1990. ISBN 0201175606.) and the unroll-and-pack approach first proposed by Larsen and Amarasinghe in LARSEN, Samuel, et al. Exploiting Superword Level Parallelism with Multimedia Instruction Sets. In *Proceedings of SIGPLAN Conference on Programming Language Design and Implementation*. June 2000, pp. 145-156.

The alignment constraints of SIMD memory units present a great challenge to automatic simdization. Consider the code fragment in FIG. 1 where integer arrays a, b, and c are aligned (An aligned reference means that the desired data reside at an address that is a multiple of the vector register size.). Although this loop is easily vectorizable for traditional vector processors, it is non-trivial to simdize it for SIMD architectures with alignment constraints. Hence, the most commonly used policy today is to simdize a loop only if all memory references in the loop are aligned.

A very extensive discussion of alignment considerations is provided by LARSON, Samuel, et al. Increasing and Detecting Memory Address Congruence. In *Proceedings of 11th International Conference on Parallel Architectures and Compilation Techniques*. September 2002. However, LARSON is concerned with the detection of memory alignments and with techniques to increase the number of aligned references in a loop, whereas our work focuses on generating optimized SIMD codes in the presence of misaligned references. The two approaches are complementary. The use of loop peeling to align accesses was discussed in LARSON as well as in the aforementioned BIK reference. The loop peeling scheme is equivalent to the eager-shift policy with the restriction that all memory references in the loop must have the same misalignment. Even under this condition, our scheme has the advantage of generating simdized prologue and epilogue, which is the by-product of peeling from the simdized loop.

Direct code generation for misaligned references have been discussed by several prior works. The vectorization of misaligned loads and stores using the VIS instruction set is described in CHEONG, Gerald, et al. An Optimizer for Multimedia Instruction Sets. In *Second SUIF Compiler Workshop*. August 1997. The aforementioned BIK, et al. reference described a specific code sequence of aligned loads and shuffle to load memory references that cross cache line boundaries, which is implemented in Intel's compiler for SSE2. However, their method is not discussed in the context of general misalignment handling.

The VAST compiler, a commercial product by Crescent Bay Software, has some limited ability to simdize loops with multiple misaligned references, unknown loop bounds, and runtime alignments, and exploit the reuse when aligning a steam of contiguous memory. The VAST compiler, however, produces less than optimal simdized code, as its highly generalized scheme for handling misalignment can produce additional compilation overhead.

An interesting simdization scheme using indirect register accesses is discussed in the aforementioned NAISHLOS, et al. reference. However, their method is specific to the eLite processor, which supports more advanced vector operations (such as gather and scatter operations) than are available on typical MME processors. In SHIN, Jaewook, et al. Compiler-Controlled Caching in Superword Register Files for Multimedia Extension Architectures. In *Proceedings of International Conference on Parallel Architectures and Compilation Techniques*. September 2002, register packing and shifting instructions were used to exploit temporal and spatial reuse in vector registers. However, their work does not address alignment handling.

Another work that is of note, but which is in the area of compiling for distributed memory systems as opposed to SIMD architectures, is CHATTERJEE, Siddhartha, et al. Modeling Data-Parallel Programs with the Alignment-Distribution Graph. *J. of Programming Languages*. 1994, vol. 2, no. 3, pp. 227-258.

Previous work in the area of vectorization and simdization of loop code, however, has failed to address the issue of what are referred to herein as "heterogeneous loops." A heterogenous loop contains different statements that can be efficiently executed on either a scalar processor, a SIMD or other vector processor, or both. For example, on the POWERPC 970 processor, double-precision floating point operations can only be executed as scalar operations, as the vector processing unit does not support double-precision operations. Most fixed-point operations can be executed on either the vector unit or a scalar unit, but the choice as to whether to vectorize a given loop or not is not always straightforward. For example, on the POWERPC 970, 32-bit fixed-point multiplication can be executed on the vector unit using a sequence of SIMD instructions, but processing four elements at a time, while the scalar unit requires only one instruction, but can process only one element at a time.

Existing compilers, such as the aforementioned VAST compiler, do not effectively address the scalar/vector tradeoff associated with heterogeneous loops. For example, the VAST compiler, when faced with a loop containing some operations that can be executed on a vector unit and some operations that cannot be executed on a vector unit, will simply perform no vectorization of the loop at all.

Another approach that has been proposed is to split such a loop into two loops, one with operations to be executed on the vector unit, which is subsequently simdized, and the other with operations to be executed on scalar units. There are two drawbacks to this approach, however. First, splitting the loop creates more loops with shorter loop bodies. This makes it more difficult to schedule instruction execution so as to provide for instruction-level parallelism. Second, splitting the loop results in separate loops with either all vector instructions or all scalar instructions. This means that when the vector loop is executed, the scalar units of the processor may sit idle, and vice versa.

Thus, there is a need for a compilation scheme to produce optimized code for heterogeneous loops. The present invention provides a solution to these and other problems, and offers other advantages over previous solutions.

SUMMARY

A preferred embodiment of the present invention provides a method, computer program product, and information handling system for generating mixed-mode operations in the compilation of program code for processors having vector or SIMD processing units. In a preferred embodiment of the present invention, program instructions making up the body of a loop are abstracted into virtual vector instructions. These virtual vector instructions are treated, for initial code optimization purposes, as vector instructions (i.e., instructions written for the vector unit). The virtual vector instructions are eventually expanded into native code for the target processor, at which time a determination is made for each virtual vector instruction as to whether to expand the virtual vector instruction into native vector instructions, into native scalar instructions, into calls to pre-defined library functions, or into a combination of these. A cost model is used to determine the optimal choice of expansion based on hardware/software constraints, performance costs/benefits, and other criteria.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1 is a diagram of a loop in a C-like programming language that may be simdized/vectorized in accordance with a preferred embodiment of the present invention;

FIG. 3D is a diagram depicting a stream shift operation corresponding to the shift depicted in FIG. 3B, but in accordance with a preferred embodiment of the present invention, in which prepended values are utilized to ensure that the resulting generated code performs a left shift operation;

FIG. 4 is a diagram depicting an algorithm in which a data reorganization graph is recursively traversed and all stream shift operations are normalized such that the resulting generated code performs only left shift operations;

FIG. 7 is a diagram depicting the application of a cost model to chose an appropriate expansion for virtual vector operations in accordance with a preferred embodiment of the present invention;

FIGS. 8A-8D are diagrams depicting a progression of a fragment of loop code through a process of mixed-mode code generation in accordance with a preferred embodiment of the present invention;

DETAILED DESCRIPTION

Figure 2A:
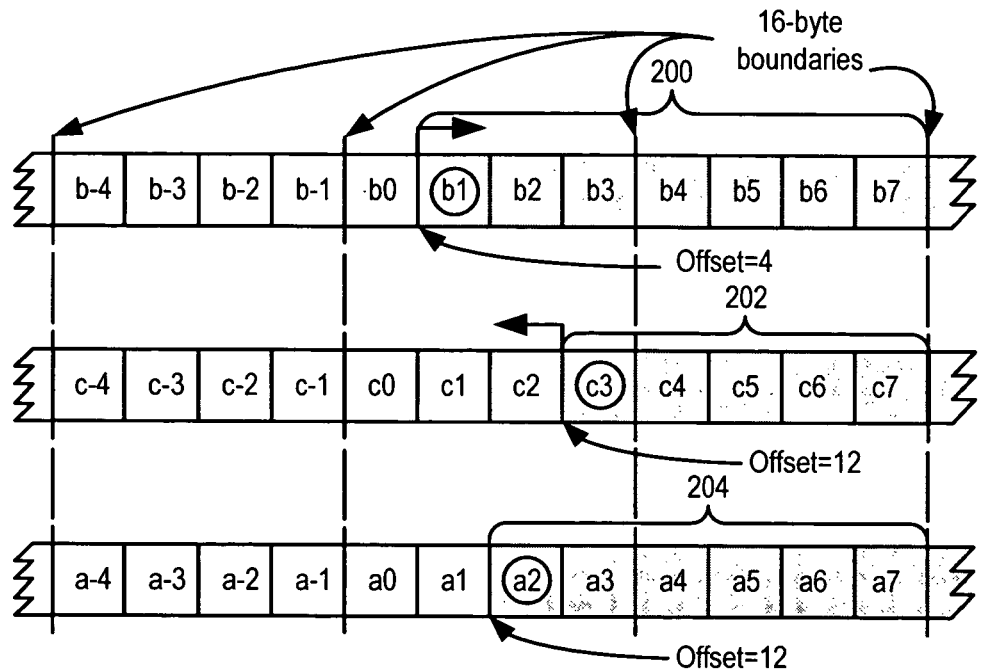
FIG. 2A is a diagram depicting a memory-misaligned set of data streams involved in a loop.

The following is intended to provide a detailed description of an example of the invention and should not be taken to be limiting of the invention itself. Rather, any number of variations may fall within the scope of the invention, which is defined in the claims following the description.

A preferred embodiment of the present invention combines generation of mixed-mode loop code for vector-enabled processors with the simdization of sequential loop code. Sections 1-4 of this Detailed Description describe the process for simdizing loop code that is utilized by a preferred embodiment of the present invention. Section 5 then describes a method of generating mixed-mode loop code, which may be combined with the simdization technique described in Sections 1-4. Finally, Section 6 provides an example of a computing platform in which a preferred embodiment of the present invention may be implemented.

1. Preliminary Matters

In this section, an overview of the alignment handling framework of the incorporated EICHENBERGER application is provided, some of the key concepts that a preferred embodiment of the present invention is built upon are highlighted.

1.1. Alignment Constraints of a Valid Simdization

Figure 1:
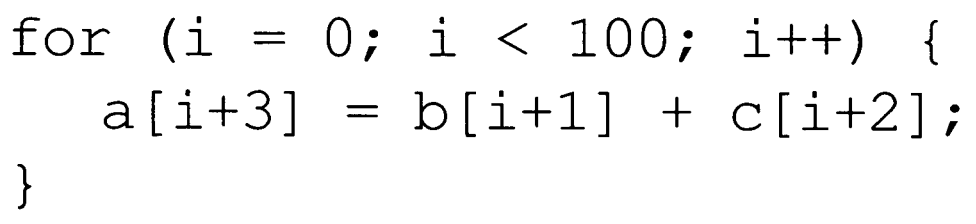

A valid vectorization for traditional vector units is only constrained by dependencies. This is no longer sufficient when simdizing for architectures with alignment constraints. Consider the loop a[i+2]=b[i+1]+c[i+3] in FIG. 1. Since there is no loop-carried dependence, a straightforward vectorization simply involves replacing scalar operations by corresponding vector operations. The generated code, however, will execute incorrectly if the hardware has alignment constraints. For example, in the VMX instruction set, due to the address truncation effect, a vector load from address of b[1] (i.e., vload b[1]) actually loads b[0] ... b[3], instead of the desired b[1] ... b[4]. Similarly, vload c[3] loads c[0] ... c[3], instead of the desired c[3] ... c[6]. Adding the two vectors yields b[0]+c[0] ... b[3]+c[3], which is clearly not the result specified by the original b[i+1]+c[i+3] computation. Therefore, for hardware platforms with strict alignment requirements, a valid simdization must satisfy additional alignment constraints:

When simdizing a store operation, the byte offset of the data to be stored in the vector register must match the memory alignment of the original store address.

When simdizing a binary operation, data involved in the original computation must reside at the same byte offset in their respective vector registers.

1.2 Stream and Stream Offset

The byte offset of data in a vector register is the key to expressing alignment constraints of a valid simdization. To capture the byte offset property within a loop, the abstraction of stream is introduced. There are two types of streams, a memory stream that represents the sequence of contiguous memory locations accessed by a memory reference over the lifetime of a loop, and a register stream that represents the sequence of consecutive registers produced by a SIMD operation over the lifetime of a loop.

Figure 2B:
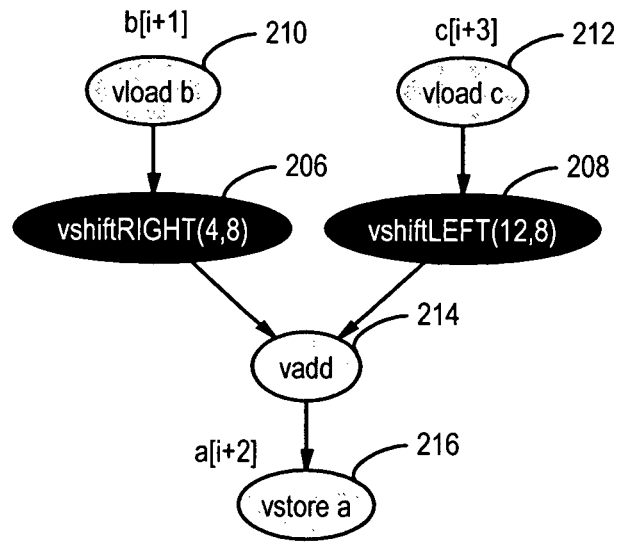
FIG. 2B is a data reorganization graph representing a set of operations performed in simdized loop code generated according to the teachings of the incorporated EICHENBERGER reference using an eager-shift realignment policy.

Vector operations in a loop can be viewed as operations over streams. A vector load consumes a memory stream and produces a register stream. As data is read from memory in discrete chunks of 16 bytes, extra values may be introduced at the beginning and the end of a register stream. To indicate the boundaries of a register stream, the concept of a stream offset is introduced. The stream offset is defined as the byte offset of the first desired value in the first register of a register stream. Note that the stream offset of a register stream generated by of a vector load is dictated by the alignment of the input memory stream. The alignment of a memory stream is the alignment of the first element of the memory stream, namely the byte memory address of the first element modulo the byte width of the SIMD unit. For example, in FIG. 2B, the stream offset of vload b[i+1] (vload operation 210) is 4. Conversely, a vector store consumes a register stream and produces a memory stream where the offset of the input register stream must match the alignment of the memory stream. Finally, all other vector operations consume register streams with matching offsets and produce a register stream with the same offset.

1.3 Stream Shift and Alignment Policies

A valid simdization requires the offsets of register streams involved in the computation to satisfy alignment constraints.

In the presence of misalignments, this property is only achievable by judiciously inserting data reorganization operations to enforce the desired stream offset. The stream shift operation, vshiftstream(S,c), is introduced for this purpose. vshiftstream(S,c) shifts all values of a register stream S across consecutive registers of the stream to an offset of c. Note that, once the first element of a stream satisfies the alignment constraints, the rest of the stream also satisfies the alignment constraints. There are several policies to generate a valid simdization, each of which is discussed in greater detail in the incorporated EICHENBERGER application.

Zero-Shift Policy

Figure 2C:
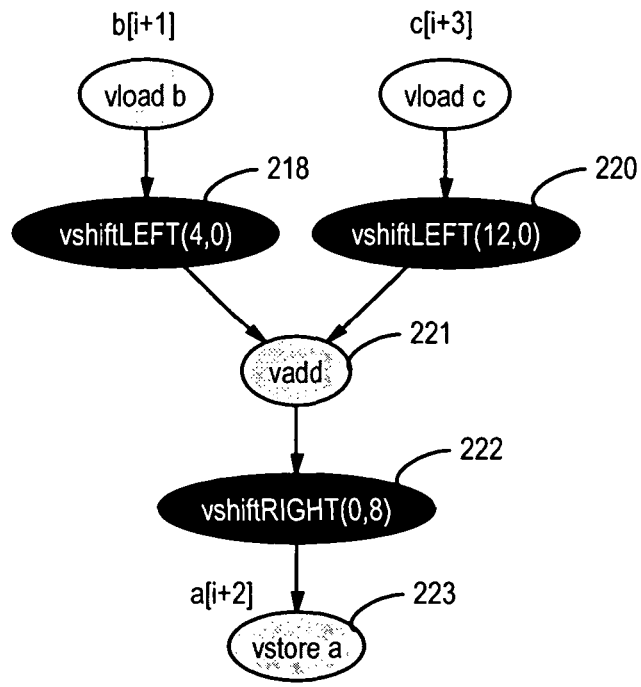
FIG. 2C is a data reorganization graph representing a set of operations performed in simdized loop code generated according to the teachings of the incorporated EICHENBERGER reference using an zero-shift realignment policy.

This policy shifts each misaligned load stream to 0, and shifts the register stream to be stored to the alignment of the store address. The simdization in FIG. 2C uses the zero-shift policy. It is the least optimized as it inserts a stream shift for each misaligned memory stream. Left shift operation 218 shifts the "b" stream left by one value (4 bytes) to offset 0, and left shift operation 220 shifts the "c" stream left by three values (12 bytes) to offset 0. After addition operation 221, the result is shifted right two values (8 bytes) by right shift operation 222 from offset 0 to offset 8, for storage (store operation 223).

Eager-Shift Policy

This policy shifts each load directly to the alignment of the store. The simdization in FIG. 2B uses this policy. In a preferred embodiment, eager-shift is the default policy for compile time alignment. Right shift operation 206 shifts the "b" stream right 4 bytes to place the "b" stream in at the proper alignment for storing the result (in "a"). Likewise, left shift operation 208 shifts the "C" stream left 4 bytes to place the "C" stream in at the proper alignment for storing the result (in "a"). The result of addition operation 214 can then be directly stored into memory for array "a" (store operation 216).

Lazy-Shift Policy

This policy is based on the eager-shift policy but pushes the shift as close to the root of the expression tree as possible. Consider the example of a[i+3]=b[i+1]+c[i+1]. This policy exploits the fact that b[i+1] and c[i+1] are relatively aligned, and thus can be safely operated on as is. Therefore, only the result of the add needs to be shifted so as to match the alignment of the store.

Dominant-Shift Policy

This policy further reduces the number of stream shifts by shifting register streams to the most dominant stream offset in an expression tree.

2. Efficient Runtime Alignment Handling

In this section, an intuitive explanation of the approach applied in a preferred embodiment of the present invention is provided in Section 2.1. Then, the overall simdization framework in described in Section 2.2. Section 2.3 describes an algorithm to transform an arbitrary stream shift to a shift left, and the correctness of this algorithm is proved in Section 2.4.

Note that all examples in this section have compile-time alignments, for simplicity. It will be demonstrated, however, that the code generation algorithm employed in a preferred embodiment of the present invention never uses specific properties of their values. Thus, this algorithm is suitable for runtime alignment as well.

2.1. An Intuitive Example

Figure 3A:
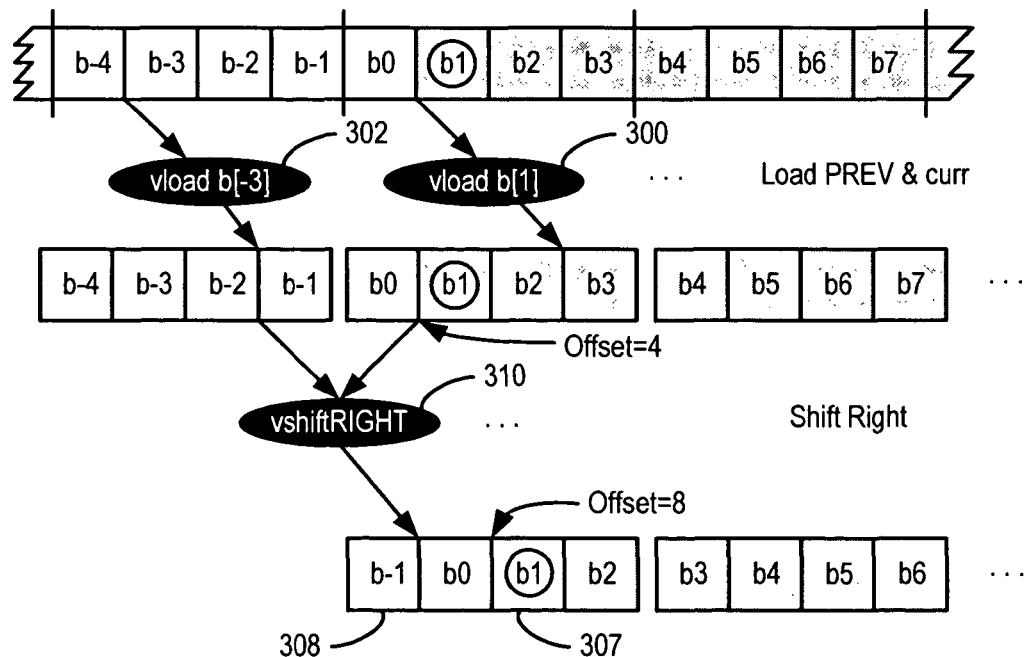
FIG. 3A is a diagram depicting a stream shift operation according to the manner described in the incorporated EICHENBERGER reference, wherein the stream shift operation shifts a data stream to the right.
Figure 3B:
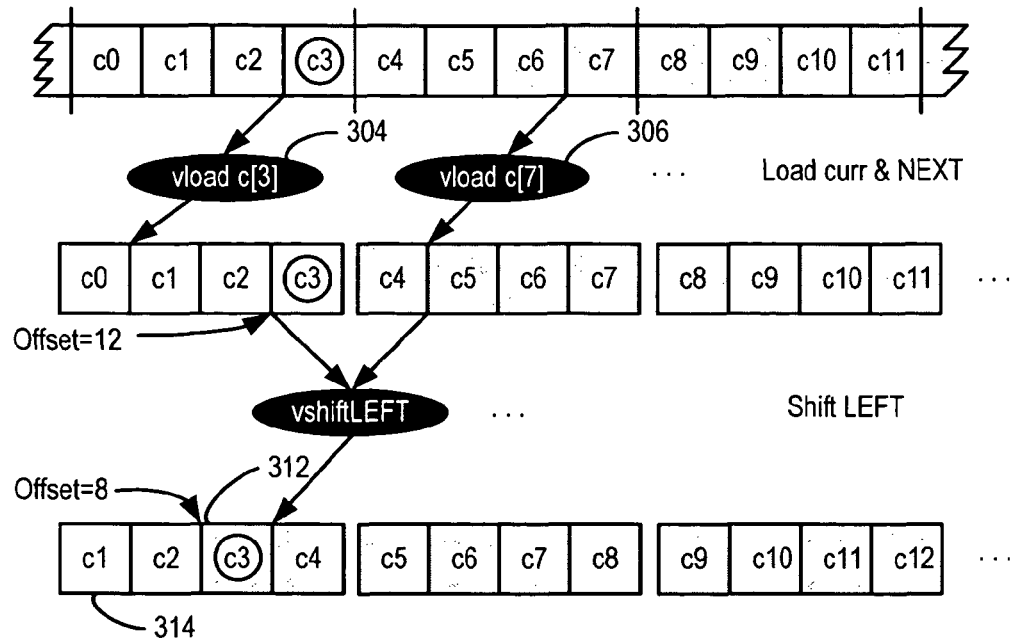
FIG. 3B is a diagram depicting a stream shift operation according to the manner described in the incorporated EICHENBERGER reference, wherein the stream shift operation shifts a data stream to the left.

Consider the initial example of a[i+2]=b[i+1]+c[i+3]. Given the data layout in FIG. 2A, memory streams a[i+2] (data stream 204), b[i+1] (data stream 200), and c[i+3] (data stream 202) have three distinct alignments, 8, 4, and, 12, respectively. Using the eager-shift policy, a minimum cost simdization of the loop involves two shifts, i.e., a shift stream of vload b[i+1] from its original offset of 4 to 8, as depicted in FIG. 3A, and a shift stream of vload c[i+3] from offset 12 to 8, as shown in FIG. 3B.

While this approach works well for stream offsets known at compile time, it does not work for runtime alignment for the following reason. Generally, shifting a stream from offset x to offset y corresponds to a right shift when x≤y and a left shift when x≥y. When generating codes for a right shift (as in FIG. 3A), one must combine values from the current register (e.g., vload b[1] operation 300) with values from the previous register (e.g., vload b[−3] operation 302). Contrasting this to the algorithm for a left shift (as in FIG. 3B), one must combine the values from the current register (e.g., vload c[3] operation 304) with values from the next register (e.g., vload c[7] operation 306). Thus, when a stream offset is known only at runtime, the compiler cannot determine whether to generate codes that shift a stream left or right.

A key insight is to realize that this issue occurs because one is focusing on the first value of a stream. Consider, then, the case in which one focuses instead on a value before the first element, specifically on the value that is at offset zero of the register containing the first element after the shifting. For example, in FIG. 3A, the first value of the stream is b[1] (value 307), so b[−1] (value 308) is the value that will be at offset zero after shifting the stream to offset 8. Similarly in FIG. 3B, the first value of the stream is c[3] (value 312), so c[1] (value 314) will land at offset zero in the shifted register stream. It should be noted that the new values can be mechanically derived from the original first values. They are simply the values that are 8 bytes (i.e., precisely the destination offset of the stream shift) before the original first values.

Figure 3C:
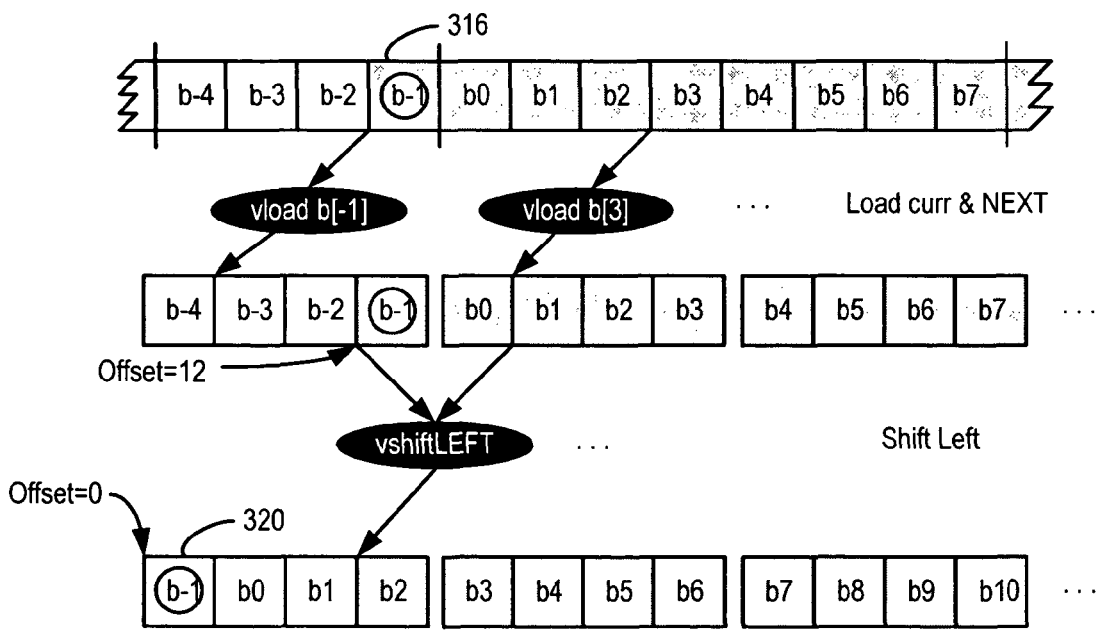
FIG. 3C is a diagram depicting a stream shift operation corresponding to the shift depicted in FIG. 3A, but in accordance with a preferred embodiment of the present invention, in which prepended values are utilized to ensure that the resulting generated code performs a left shift operation.

Suppose one focuses, now, on two new streams that are constructed by prepending a few values to the original b[i+1] and c[i+3] streams so that the new streams start at, respectively, b[−1] (value 316) and c[1] (value 318). These new streams are shown in FIGS. 3C and 3D with the prepended values in light grey. Using the same definition of the stream offset as before, the offsets of the new streams are 12 and 4 bytes, respectively.

By definition, the newly prepended streams will be shifted to offset zero. The shifted new streams yield the same sequence of registers as that produced by shifting the original stream (highlighted with dark grey box with light grey circle), as confirmed by visual inspection of the outcome of FIGS. 3A and 3C as well as FIGS. 3B and 3D. This holds because the initial values of the new streams were selected precisely as the ones that will land at offset zero in the shifted version of the original streams. Since shifting any stream to offset zero is a left shift, this prepending and shifting operation effectively transforms an arbitrary stream shift into a shift left, as shown in FIGS. 3C and 3D.

2.2. Overview of the Simdization Framework

Now an overview of the overall simdization framework that the stream shift algorithm is based upon is provided. The framework that contains three phases:

Data Reorganization Phase. This phase takes, as input, an expression tree and generate a tree with generic SIMD operations as well as stream shifts that are inserted to satisfy the alignment constraints of the simdized operations. The augmented expression tree is called a data reorganization graph, such as the ones shown in FIGS. 2B and 2C. Different shift placement policies can be applied to minimize the number of shifts generated.

Shift Normalization Phase.

This phase transforms all stream shifts in a data reorganization graph to stream left shifts. The output is still a data reorganization graph.

Code Generation Phase.

This phase takes a data reorganization graph as input and maps generic SIMD operations and left shift operations to machine instructions. Specifically, the algorithm maps vshiftleft to native permutation instructions that "shifts" across a pair of vector registers, e.g., vec_perm on VMX. This phase also addresses issues such as resulting loads when shifting a stream, handling unknown loop counts and multiple statements, and efficient prologue/epilogue generation.

Of primary importance to a preferred embodiment of the present invention is the shift normalization phase that converts arbitrary stream shifts to stream shift left. The other two phases function essentially as described in the incorporated EICHENBERGER reference. Therefore, the rest of the section will focus on the shift normalization algorithm.

2.3. Transforming a Stream Shift to Shift Left

As illustrated in Section 2.1, an arbitrary stream shift, vshiftstream(S,x), can be converted to a stream shift left by shifting a derived stream, one that starts exactly x bytes before the first value of S, to offset zero. For the ease of description, introduce two operators are introduced: Prepend(S,x), which prepends x bytes at the beginning of stream S, and Skip(S,x), which skips the first x bytes of stream S. Using these two new operators, the above statement can be restated as, $$vshiftstream(S,y) \Rightarrow Skip(vshiftstream(Prepend(S,y), 0),y). \quad (1)$$

Consider now the Skip operation in Equation (1). In this equation, one always skips y<V bytes from a register stream with offset zero. (By definition, vshiftstream(Prepend(S,y),0) has an offset of zero.) Since a register stream is a sequence of V byte wide registers, skipping strictly less than V bytes from offset 0 never skips a whole register and thus has no effect on which registers to produce in a register stream. It only serves for bookkeeping purposes to maintain that the transformed stream has the same offset and length properties as the original stream. Thus, it can be safely ignored during the code generation phase.

For the Prepend operation in Equation (1), there are two cases to consider. When prepending to a memory stream, one simply subtracts x bytes from the memory address. Directly prepending to a register stream is not feasible. However, one can propagate Prepend operations to the leaves of an expression tree until memory streams are reached. Below we describe how to perform Prepend for each type of nodes in a data reorganization graph.

VLOAD(addr(i)) This node represents a vector load from a stride-one accesses addr(i). Therefore, $$Prepend(VLOAD(addr(i)),x) \Rightarrow VLOAD(addr(i)-x) \quad (2)$$

VOP(src$_1$, ..., src$_n$) This node represents a generic operation that takes as input register streams associated with nodes src$_1$, ..., src$_n$ and produces one output register stream. (Generic operations represent all vectorizable operations except for the ones that shuffle values inside vector registers or the ones that convert data of different data sizes.) Thus, $$Prepend(VOP(src_1,...,src_n),x) \Rightarrow VOP(Prepend(src_1, x),..., Prepend(src_n,x)) \quad (3)$$

VSHIFTSTREAM(src,to) This node shifts the register stream associated with the input node src to offset to, producing a register stream with a stream offset to. Thus, $$Prepend(VSHIFTSTREAM(src,to),x) \Rightarrow VSHIFT-STREAM(Prepend(src,x),(to-x)mod\ V) \quad (4)$$

In FIG. 4, pseudocode for a shift normalization routine is depicted, where the function Normalizestream recursively traverses the tree from the root of a data reorganization graph until all vshiftstream are normalized. Through an application of the routine depicted in FIG. 4, a data reorganization graph of the type described in EICHENBERGER may be transformed into a normalized graph in which all stream shifts have been replaced with left shifts. In this way, code may be generated in which the actual degree of misalignment between the data streams is not known until runtime.

2.4. Proof of Correctness

In this section, the correctness of two important equations in Section 2.3 is proved. The first theorem demonstrates the validity of sinking a prepend past a stream shift, i.e., Equation (4).

Theorem 1. The following equality holds for an arbitrary stream S and V-byte wide SIMD unit:

$$Prepend(VSHIFTSTREAM(S,to),x) \equiv VSHIFT-STREAM((S,x),(to-x)mod\ V)$$

Proof. As a preliminary step, the properties of Prepend(S,x) are first defined as functions of those of S. As x bytes are added at the head of the stream, the offset and length of the prepended stream becomes (Offset(S)−x)mod V and Length (S)+x, respectively. Similarly, the offset and length properties of VSHIFTSTREAM(S,to) becomes to and Length(S), respectively.

The equality of the two streams is now proven by demonstrating that they derive from the same register stream and have the same offset and length properties.

$$Offset(Prepend(VSHIFTSTREAM(S,to),x))=(Offset\ (VSHIFTSTREAM(S,to))-x)mod\ V$$

$$=(to-x)mod\ V$$

$$Length(Prepend(VSHIFTSTREAM(S,to),x))=Length\ (VSHIFTSTREAM(s,to))+x$$

$$=Length(S)+x$$

$$Offset(VSHIFTSTREAM(Prepend(S,x),(to-x)mod\ V))=(to-x)mod\ V$$

$$Length(VSHIFTSTREAM(Prepend(S,x),(to-x)mod\ V)=Length(S)+x$$

□

Using Theorem 1, the validity of transforming arbitrary stream shift to stream shift left, i.e., Equation (1), can be demonstrated.

Theorem 2. A register stream S with arbitrary offset can be shifted to an arbitrary target offset to by (1) prepending to bytes to S, (2) shifting the resulting stream to offset zero, and (3) skipping the first to values of the resulting stream.

Proof. Since Skip is a reciprocal of Prepend, the following $S_1 \equiv Skip(Prepend(S_1,x),x)$ holds for any stream $S_1$ Let $S_1$ be VSHIFTSTREAM(S,to), it can be stated that $$VSHIFTSTREAM(S,to) \equiv Skip(Prepend(VSHIFT-STREAM(S,to),to),to).$$

Using Theorem 1 to permute Prepend and VSHIFT-STREAM, one obtains, $$VSHIFTSTREAM(S,to) \equiv Skip(VSHIFTSTREAM\ (Prepend(S,to),0)to).$$

□

3. Alignment Handling for Length Conversion

For the purpose of describing a preferred embodiment of the present invention, the term "length conversion operation" is defined as any operation that converts a stream into a stream of a different length. The most common length conversion operations are type conversions between data of different sizes. When processing typecasts (as in the C programming language, which supports long and short "int" types, for example), the primary focus is on the data reorganization aspect of type conversion. Further data processing beyond data reorganization, such as sign extensions or floating point conversions, for example, can be handled by additional non-length-conversion vector operations.

Two types of length conversion operations are defined.

VPACK(S,f). This operation packs a stream S by a factor f, e.g., a conversion from 4 to 2 byte data types is a vpack with a factor of 2. The length of the packed stream is divided by f and its offset is represented as, $$\text{Offset}(VPACK(S,f))=\text{Offset}(S)/f. \quad (5)$$

VUNPACK(S,f). This operation unpacks stream S by a factor f, e.g., conversion from 4 to 8 byte data types is a vunpack with a factor of 2. The of the unpacked stream is multiplied by f and its offset is, $$\text{Offset}(VUNPACK(S,f))=\text{Offset}(S)*f. \quad (6)$$

Length conversions have a significant impact on the simdization framework. The rest of the section explains how to incorporate them into the three phases of the framework.

3.1. Data Reorganization Phase

The scaling effect of length conversion on stream offsets affects all but the least optimized Zero-shift alignment policy. The Zero-shift policy is not affected by length conversions because the scaling impact on an offset of value 0 still results in an offset of 0. As defined in Section 1.3 and the incorporated EICHENBERGER application (in the absence of length conversions), the Eager-shift policy shifts each misaligned load stream directly to the alignment of the store. In the presence of length conversions, the store alignment is still propagated to load nodes, but its alignment value is scaled up/down by the packing/unpacking factors when traversing length conversion nodes. (Since stream offsets are propagated from the store to the loads, in the reverse direction of the data flow, Equations (5) and (6) are used in the reverse direction.) Similarly in the Lazy-shift policy, the target shift offset is also scaled when moving stream shifts past a pack/unpack node, i.e., $$VPACK(VSHIFTSTREAM(S,to),f)=VSHIFT\text{-}STREAM(VPACK(S,f),to/f)$$

$$VUNPACK(VSHIFTSTREAM(S,to),f)=VSHIFT\text{-}STREAM(VUNPACK(S,f),to*f)$$

3.2 Stream Shift Normalization Phase

Figure 5:
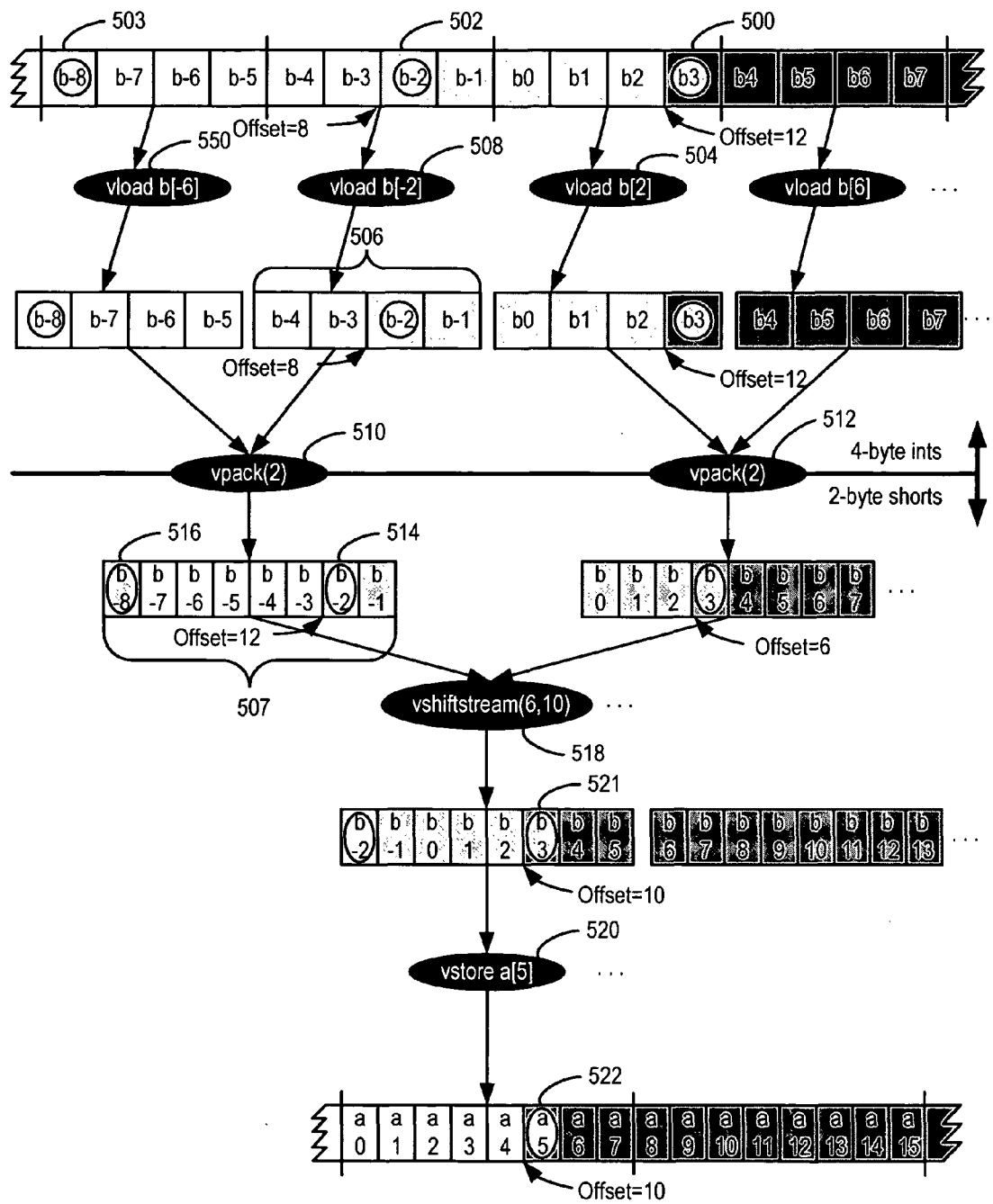
FIG. 5 is a diagram depicting a simdized loop in accordance with a preferred embodiment of the present invention, in which a type conversion between data types of different lengths is performed.

In the normalization phase, the implementation of Prepend is augmented to accommodate length conversions. Consider the example of a[i+5]=(short)$_b$[i+3] where a is an array of short and b is an array of integer. FIG. 5 illustrates the streams of a valid simdization of the loop. Using the Prepend algorithm described in Section 2.3, the original b[i+3] memory stream (dark grey) starting at b[3] (value 500) is prepended by 20 bytes so as to start at b[−2] (value 502) (prepended values being displayed in light grey). When loading b[−2] (load operation 508) from memory, the SIMD load unit truncates the address at 16 byte boundaries and loads b[−4] . . . b[−1] (values 506). However, as shown in FIG. 5, because of packing node (vpack operation 510) between the load and the stream shift, the b[−8] . . . b[−1] values (values 507) are what are needed. (For clarity, this discussion focuses on the generation of the first batch of values in FIG. 5 as an illustration of what happens in the steady state. When processing the first (or last) batch of values, it is sometime possible to eliminate some of the computations (e.g., vload b[−6] operation 550) that do not impact the final values that can legally be stored. However, no such elimination can occur in the steady state.)

The solution employed by a preferred embodiment of the present invention is to eliminate the dependence on address truncation that occurs at the memory operations by explicitly performing the desired truncation at the input stream of the stream shift operation. The solution is to further prepend the already prepended input stream of vshiftstream to the value that is at offset zero in the input register. For example, since the prepended input stream is b[−2] (values 502, 514), the stream is further prepended so that b[−8] (values 503, 516) is now the initial stream value. As can be visually seen from the figure by tracing the b[−8] value (value 516), the memory load truncation that used to occur at the load operation now occurs at the vicinity of shift stream operation 518, and is of the correct amount. The result may then be directly stored in the proper memory location for array "a" (store operation 520), with the result being truncated such that value 521 becomes the first value stored in array "a" (at value 522).

Theorem 3. In the presence of length conversion, a stream S can be shifted to an arbitrary target offset to by (1) prepending stream S by to+(Offset(S)−to)mod V bytes, (2) skipping the first (Offset(S)−to)mod V values of the resulting stream, (3) shifting the resulting stream to offset zero, and (4) skip to bytes of the shifted stream.

Note that, in Theorem 3, steps (1) and (3) produce streams of offset zero and in steps (2) and (4) the skip bytes are less than V. Therefore, the skips are only for bookkeeping purposes and can be safely ignored by code generation. Theorem 3 may be proved mathematically in a similar fashion to Theorem 2.

3.3. Code Generation Phase

During the code generation, vpack and vunpack are mapped to native permutation instructions. Some multimedia platforms even provide native packing and unpacking instructions to perform these operations, e.g., VMX. For machines where length conversions and stream shifts are both mapped to some sort of permutation instruction, the total number of extra permutation operations can be further reduced by merging together pairs of consecutive length conversion and stream shift.

4. Simdization Overview

Figure 6:
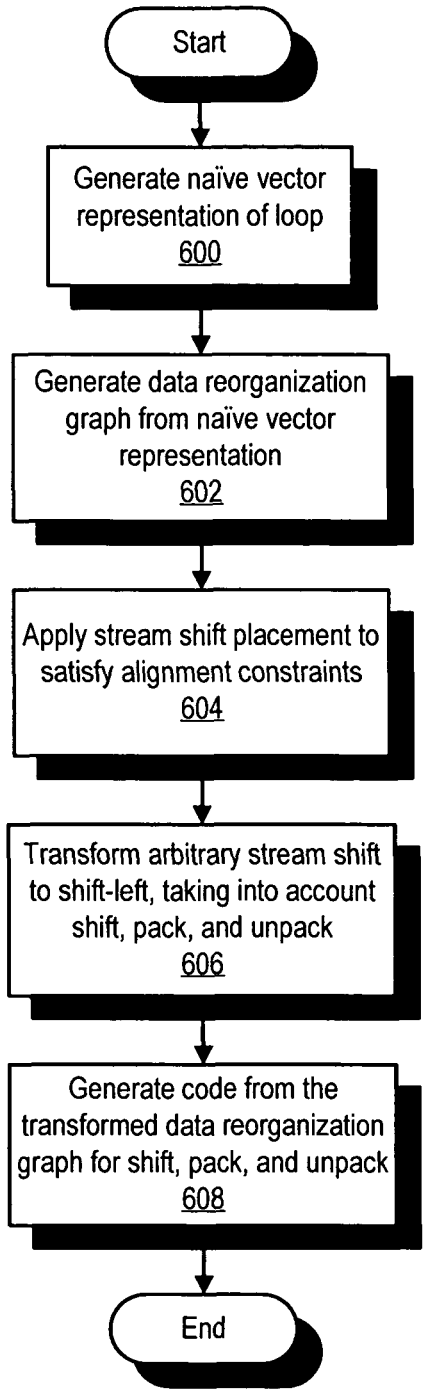
FIG. 6 is a flowchart representation of a process of vectorizing/simdizing a loop in accordance with a preferred embodiment of the present invention.

FIG. 6 is a flowchart representation of a process of simdizing a loop in accordance with a preferred embodiment of the present invention. First, a naïve vectorized representation of the loop is obtained without regard for the alignment or misalignment of the various memory streams involved (block 600). Next, a data reorganization graph is generated from the naïve vectorization (block 602). Then, stream shift operations are applied to the data reorganization graph to satisfy the data-alignment constraints of the loop (block 604). The arbitrary-direction shift operations are then converted into left shifts, taking into account not only the shift operations, but also any pack or unpack operations needed to handle datatype conversion (block 606). (Note: this conversion to left shifts may be omitted if the alignment constraints are completely known at compile time or if the above-described "zero-shift" policy is used.) Finally, code is generated from the transformed data reorganization graph, including code for shift, pack, and unpack operations (block 608).

5. Generation of Mixed-Mode Operations

A preferred embodiment of the present invention allows for the generation of "mixed-mode" loop code for heterogeneous loops. By "mixed-mode" it is meant that the compiled code generated for a given loop may contain vector code, scalar code, calls to pre-defined library functions, or some combination of these. By making some loop operations into scalar instructions, some operations into vector operations, and some operations into calls to pre-defined functions, a compiler may make a more optimal use of available hardware and software resources for a given loop having particular requirements and constraints.

For example, a loop may contain both floating-point and fixed-point operations. If the target processor does not support floating-point vector operations, it may make sense to generate the code for the fixed-point operations as vector operations, while generating the code for the floating-point operations as scalar operations.

As another, perhaps less obvious example, a loop containing several different sets of relatively unrelated fixed-point operations might be capable of being implemented using only vector instructions. However, it may actually turn out to be more efficient to implement some of the operations as scalar instructions. This is because such an implementation may allow for a higher degree of instruction-level parallelism, by allowing one or more scalar units to process instructions in parallel with the processor's vector unit.

A preferred embodiment of the present invention utilizes a technique that is akin to macro expansion to allow a single loop to be implemented using both vector and scalar instructions. Loop operations are abstracted into a set of simdized virtual vector operations—that is, virtual operations that represent operations over virtual-length vectors. Generating virtual vector operations, allows parallelizing optimizations such as loop blocking to be applied to the loop. Another beneficial characteristic of this virtual vector operation approach is that information regarding the number of elements in a vector operand is encoded into the operand itself. This allows each virtual vector operation to operate on a different number of elements.

Figures 7, 8A:
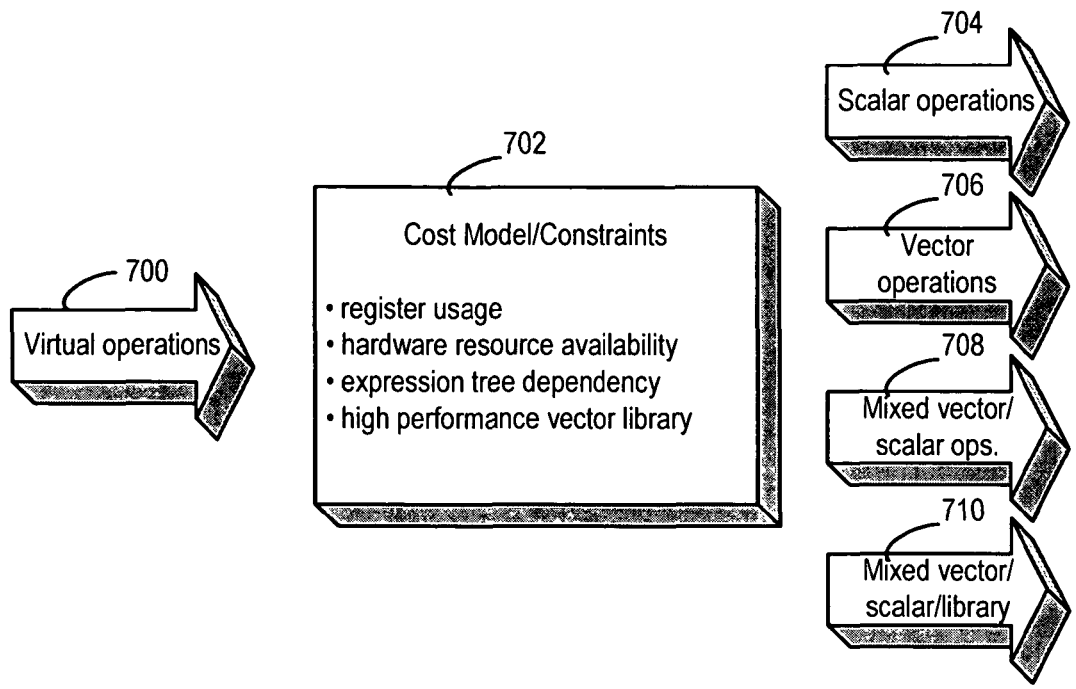

Eventually, the virtual vector instructions are expanded, macro-style, into native program code. It is at this expansion phase that the mixed-mode code generation takes place. FIG. 7 illustrates how this is done.

As depicted in FIG. 7, virtual vector operations 700 are evaluated according to a cost model 702. A given virtual vector operation may be expanded into native code in any of a number of different kinds of ways. A virtual vector operation may be expanded into a set of scalar operations 704 or it may be expanded into one or more native vector operations 706. Certain virtual vector operations may be expandable into a combination 708 of vector and scalar operations. For example, a virtual vector operation that operates on a vector of length five items may use vector instructions to operate on four of the elements in the vector, while using scalar instructions to operate on the fifth element. Where efficient pre-defined vector library functions are available, some virtual vector operations may be expanded into calls to those library functions or to a combination 710 of vector instructions, scalar instructions, and/or library calls.

Cost model 702 is used to evaluate the possible expansions of a virtual vector operation and to choose the best expansion for each virtual vector operation. This can be accomplished through the use of some form of heuristic search. A heuristic search algorithm enumerates various possible courses of action and calculates a heuristic function to evaluate the desirability of each generated choice. A best choice can then be made based on the particular course of action that maximizes the heuristic function. A number of different heuristic search techniques are known to those skilled in the art and include (but are not in any way limited to): depth-first search, breadth-first search, best-first search, beam search, branch and bound, A* search, iterative deepening, simulated annealing, and the like. The reader is directed to WINSTON, Patrick Henry. Artificial Intelligence. 2nd Edition. Reading, Mass.: Addison-Wesley, 1984. ISBN 0201082594. pp. 87-132, for additional material regarding heuristic search techniques as are known in the art.

The problem of finding an optimal solution with regard to a given cost model may also be formulated as a constraint-satisfaction problem. A number of well-known algorithms and software packages for performing linear programming, integer programming, and other forms of constraint solving over numerical and/or finite domains have been developed for solving constraint-satisfaction problems, generally, and may be utilized in an embodiment of the present invention as well.

FIGS. 8A-8D provide an example of how a preferred embodiment of the present invention may generate mixed-mode loop code in practice. FIG. 8A is an example of a heterogeneous loop, in a C-like pseudocode, to which the processes of a preferred embodiment of the present invention may be applied. Lines 800, 802, and 804 make up the body of the loop. Line 800 performs addition of two fixed-point numbers ("ints"). Line 802 performs a multiplication of two double-precision floating-point numbers. Line 804 stores an integer value that is invariant over the execution of the loop (the upper bound for the loop index) in an integer array.

The first step in generating mixed-mode loop code is to abstract lines 800, 802, and 804 into virtual vector operations. FIG. 8B shows the result of this abstraction. The addition operation of line 800 is converted into a virtual vector operation "ADD" on line 806. The multiplication operation of line 802 is converted into a virtual vector operation "MUL" on line 808. Finally, the load and store of line 804 is converted into a virtual vector operation "LOD" on line 810. Note that each of these virtual vector operations, at this point, operates on a vector containing one element, which makes lines 806, 808, and 810 act as the vector equivalents of the original scalar operations on lines 800, 802, and 804. Hence, at this point, there is no change in the loop indexing (i.e., line 812 remains unchanged from FIG. 8A to FIG. 8B).

Loop-level simdization is then applied to virtual vector operations in FIG. 8B to obtain the optimized virtual vector operations depicted in FIG. 8C. Loop-level simdization is described In FIG. 8C, each virtual vector operation (lines 816, 818, and 820) operates on a vector containing 4 elements. Thus, line 814 adjusts the loop indexing to increment by 4 at each loop iteration, rather than by 1, as was the case in FIGS. 8A-8B. Additional optimizations and adjustments to accommodate data misalignments and hardware constraints may be made in accordance with Sections 1-4 of this Detailed Description.

Finally, each virtual vector operation in FIG. 8C is expanded into an appropriate native code implementation in accordance with cost model 702 (FIG. 7) and any applicable constraints to obtain the result in FIG. 8D. Line 816, since it represents an operation on fixed-point numbers, is readily expanded into a native vector instruction ("vec_add") on line 822. Line 818, since it represents an operation on double-precision floating-point numbers (which we will assume are not supported on the target processor's vector unit in this example), must be expanded into scalar operations, rather than vector operations. Since the virtual vector operation on line 818 is a vector operation over four data elements, however, line 818 must be expanded into what essentially constitutes a four-iteration loop over scalar values. For efficiency, line 818 is expanded into an unrolled loop comprising lines 824 in FIG. 8D. Finally, line 820, referring again to a fixed-point operation, is readily expanded into vector operations on line 826. The result, shown in FIG. 8D, is a mixed-mode loop utilizing both scalar and vector operations.

Figure 9:
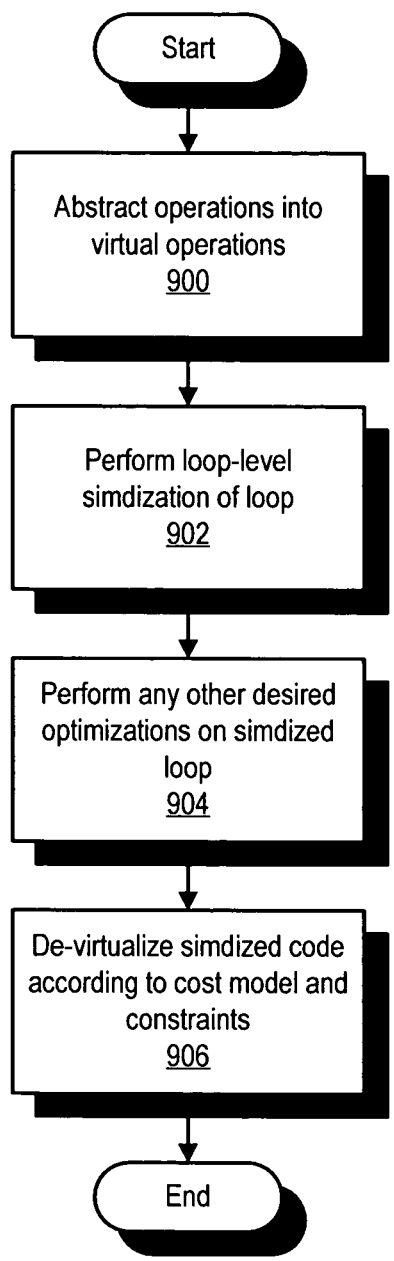
FIG. 9 is a flowchart representation of a process of mixed-mode code generation in accordance with a preferred embodiment of the present invention.

FIG. 9 is a flowchart representation of a process of generating mixed-mode loop code in accordance with a preferred embodiment of the present invention. Once a loop has been identified, the operations making up the loop body are abstracted into virtual operations (block 900). Loop-level simdization of the virtualized loop code is then performed in accordance with the techniques described in Sections 1-4 of this Detailed Description (block 902). Any additional optimizations prior to code generation are then performed (block 904). Finally, the simdized code, which now comprises virtual vector instructions, is de-virtualized, or expanded, into vector and/or scalar code according to a cost model and any applicable constraints (block 906).

6. Cost Model

Figure 10:
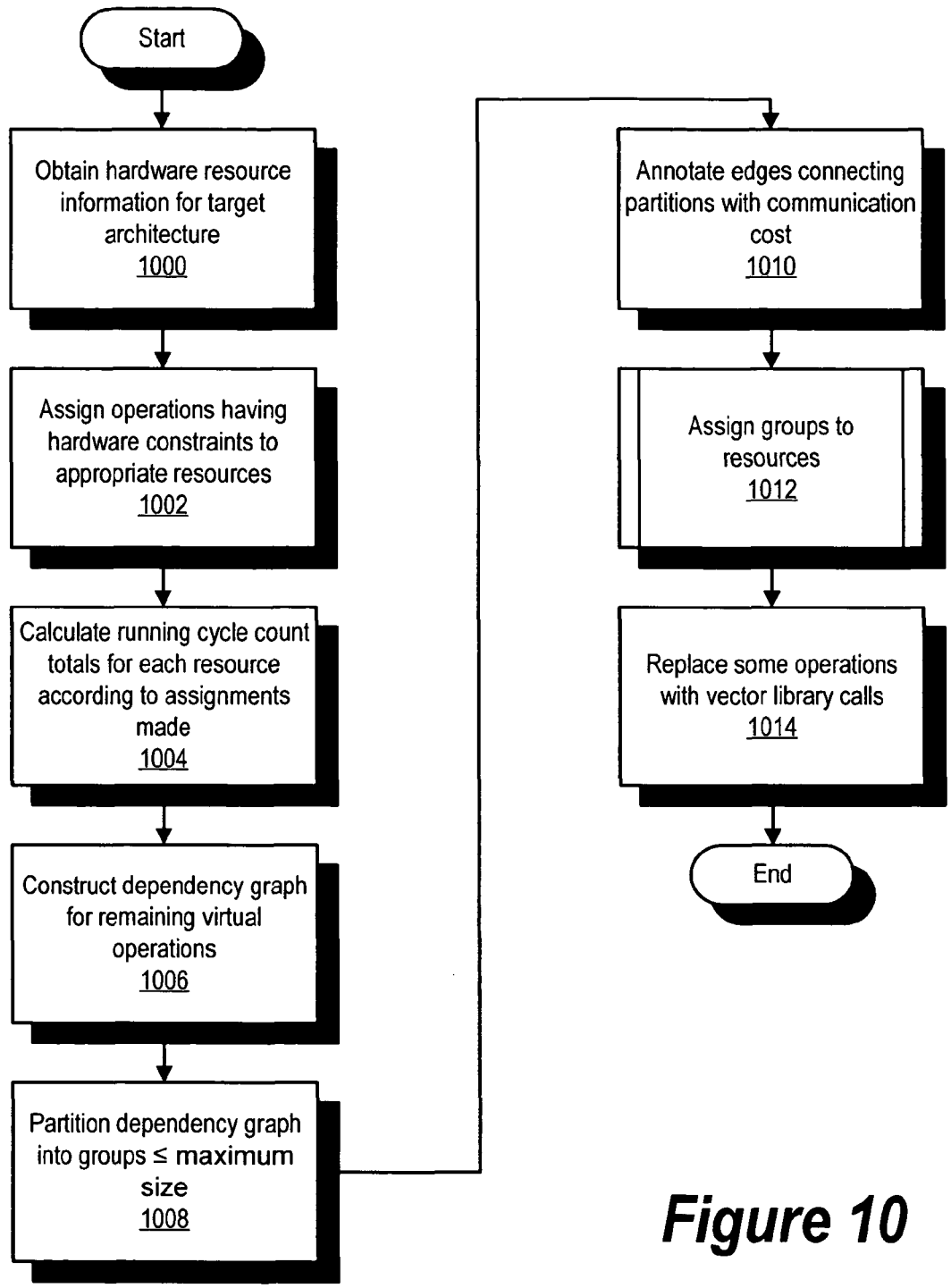
FIG. 10 is a flowchart representation of a process of operation de-virtualization in accordance with a preferred embodiment of the present invention.

FIGS. 10-13 describe the nature and application of a cost model associated with a preferred embodiment of the present invention. FIG. 10 is a flowchart representation of a process of de-virtualizing a loop of virtual vector operations in accordance with a preferred embodiment of the present invention. First, information about available hardware resources is obtained (block 1000). For example, the existence of a certain number of fixed-point units, floating-point units, vector permute units, vector ALUs (arithmetic/logic units), or memory units is determined at this point.

Next, a quick pass through the loop is made to identify those virtual vector operations that have specific hardware constraints; those operations are assigned to appropriate hardware resources according to the applicable constraints (block 1002). For example, if double-precision multiplication must be performed in the floating-point unit, any double-precision multiplication operations are assigned to the floating-point unit. Once these constrained operations have been assigned to appropriate hardware resources, a cycle count is computed for each hardware resource, according to the assignments that were made (block 1004). These cycle counts will serve as running totals as additional operations are assigned to hardware resources. In a preferred embodiment, each operation, being executed on a pipelined architecture, is assumed to take, in general, one cycle to execute. When a virtual vector operation is assigned to a scalar unit, however, the cycle count is a multiple of the number of elements in the virtual vector operand. For example, a virtual vector multiplication operation over four-element vectors, when assigned to a scalar unit, will take four cycles, since it takes four scalar multiplications, of one cycle each, to perform a four-element vector multiplication. Additional details regarding the specific method of counting cycle costs in a preferred embodiment of the present invention are provided at a later point in this Detailed Description.

Figure 11:
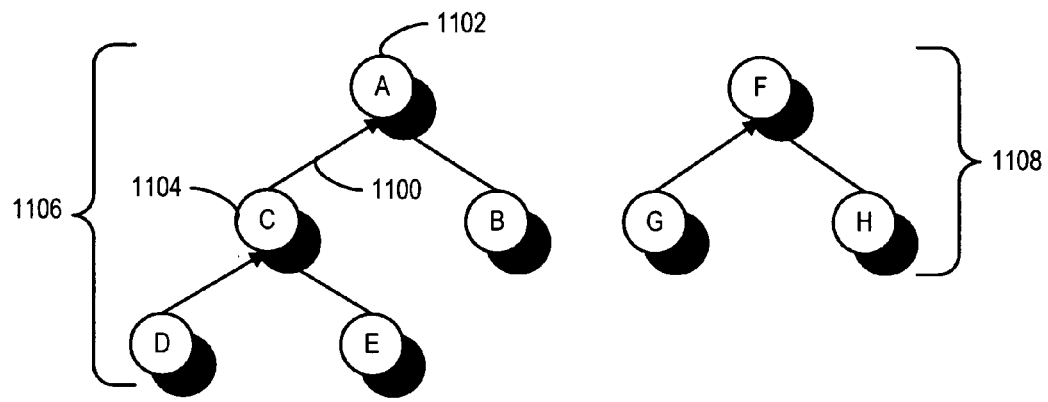
FIG. 11 is a diagram of an expression tree dependency graph in accordance with a preferred embodiment of the present invention.

Next, an expression tree dependency graph is generated for each of the other virtual operations (block 1006). FIG. 11 provides a simplified diagram of such a graph. In FIG. 11, each of the nodes in the graph represents a value that is calculated during the course of execution of the virtual vector operations in the loop body. Each edge in the graph represents a dependency of one value on a previously calculated value. For example, edge 1100 denotes that value "A" 1102 depends on value "C" 1104 in order to be calculated.

Figure 12:
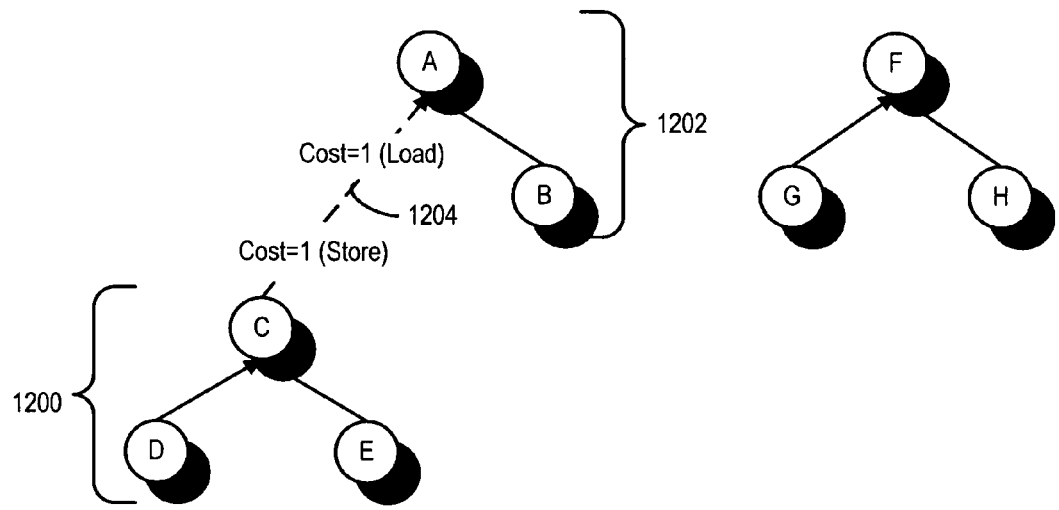
FIG. 12 is a diagram of a partitioned expression tree dependency graph in accordance with a preferred embodiment of the present invention.

From FIG. 11, it is apparent that such a dependency graph will consist of one or more "groups" (connected components) of related values. For example, in FIG. 11, there are two such groups, group 1106 and group 1108. In the process described in FIG. 10, it is possible to define a parameter that represents the maximum allowed size of a group for resource allocation purposes. The next stage in the process described in FIG. 10 is to partition the dependency graph into groups that do not exceed this maximum size (block 1008). As shown in FIG. 12, group 1106 is partitioned into a first subgroup 1200 and a second subgroup 1202 (assuming a maximum group size of 3). Next, the edges connecting the partitions are annotated with a communication cost (block 1010). For example, edge 1204 in FIG. 12 is annotated to indicate the costs (credited to the memory unit of the processor) of storing the result of subgroup 1200 (value "C") and of subsequently loading that result from memory for the purposes of performing the operations associated with subgroup 1202. If subgroups 1200 and 1202 are assigned to the same unit (e.g., both to the floating point unit, for example), the communication costs can be eliminated, since subgroup 1202 can be executed on the result of subgroup 1200 in place.

Figure 13:
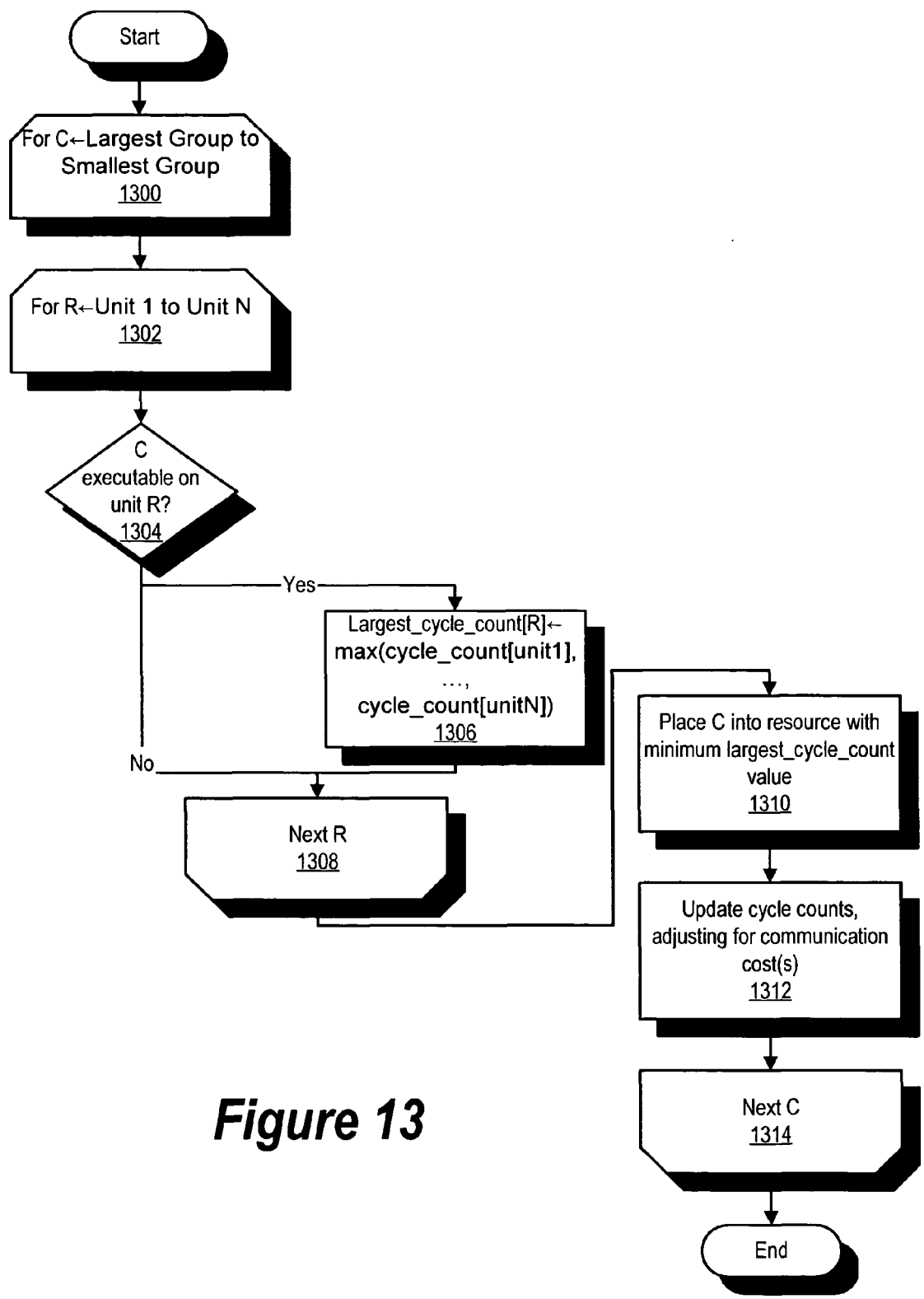
FIG. 13 is a flowchart representation of a process of assigning operation groups to hardware units in accordance with a preferred embodiment of the present invention.

At this point, the partitioned groups are assigned to hardware resources (block 1012). FIG. 13 illustrates this assignment process in greater detail. As a prerequisite to the process described in FIG. 13, the groups are sorted according to the number of operations they correspond to, such that the group with the highest number of operations is the "largest" group and the group with the least number of operation is the "smallest" group.

The assignment process depicted in FIG. 13 is a doubly-nested loop. The outer loop (index variable "C") iterates over the groups, from largest to smallest (block 1300). The inner loop (index variable "R") iterates over the various hardware resources (or "units", e.g., fixed-point unit, floating-point unit, etc.) (block 1302).

Turning now to the body of the inner loop, a determination is made as to whether group "C" can be executed on unit "R" (block 1304). If so, a "largest cycle count" value is determined for unit "R" (block 1306). This "largest cycle count" is the maximum over the running cycle count totals for all units, assuming that the current group "C" is assigned to unit "R." Following this "largest cycle count" calculation, or alternatively if "C" could not be executed on unit "R," the inner loop then completes another iteration 1308.

Once this inner loop has completed, and each unit "R" has been considered as a possible resource to which group "C" may be assigned, "C" is assigned to the unit having the minimum "largest cycle count" value out of the available units (block 1310). Having found an assignment for group "C," the running totals of cycle counts are updated to reflect the chosen assignment and to take into account any applicable communication cost(s) (block 1312). The outer loop then completes another iteration (block 1314).

In the particular architecture employed in a preferred embodiment of the present invention, there are 2 fixed-point units, 2 floating-point units, 2 memory units, 1 vector permute unit, 1 vector complex fixed unit, 1 vector floating point unit, and 1 vector simple fixed unit. (The last three of these units may also be collectively referred to as the vector arithmetic/logic unit or vector ALU.) In the case of two units of the same type in this architecture, however, there are no communication costs associated with communicating between one unit and another unit of the same type. Thus, each of these sets of two units may be treated as an effective single unit for the purpose of tallying the running cycle count, and the cycle counts for each of those units may then be determined by halving the running cycle count. The four vector units (vector permute unit, vector complex fixed unit, vector floating point unit, and vector simple fixed unit) are each treated as separate units, and their respective running cycle counts are therefore not halved.

Returning to FIG. 10, the final stage of de-virtualization is to replace selected virtual operations with vector library calls (block 1014). Appropriate candidate virtual operations that may be replaced with vector library calls may be readily identified when there are multiple independent operations of a same type found in a single resource.

7. Example Hardware Platform

Figure 14:
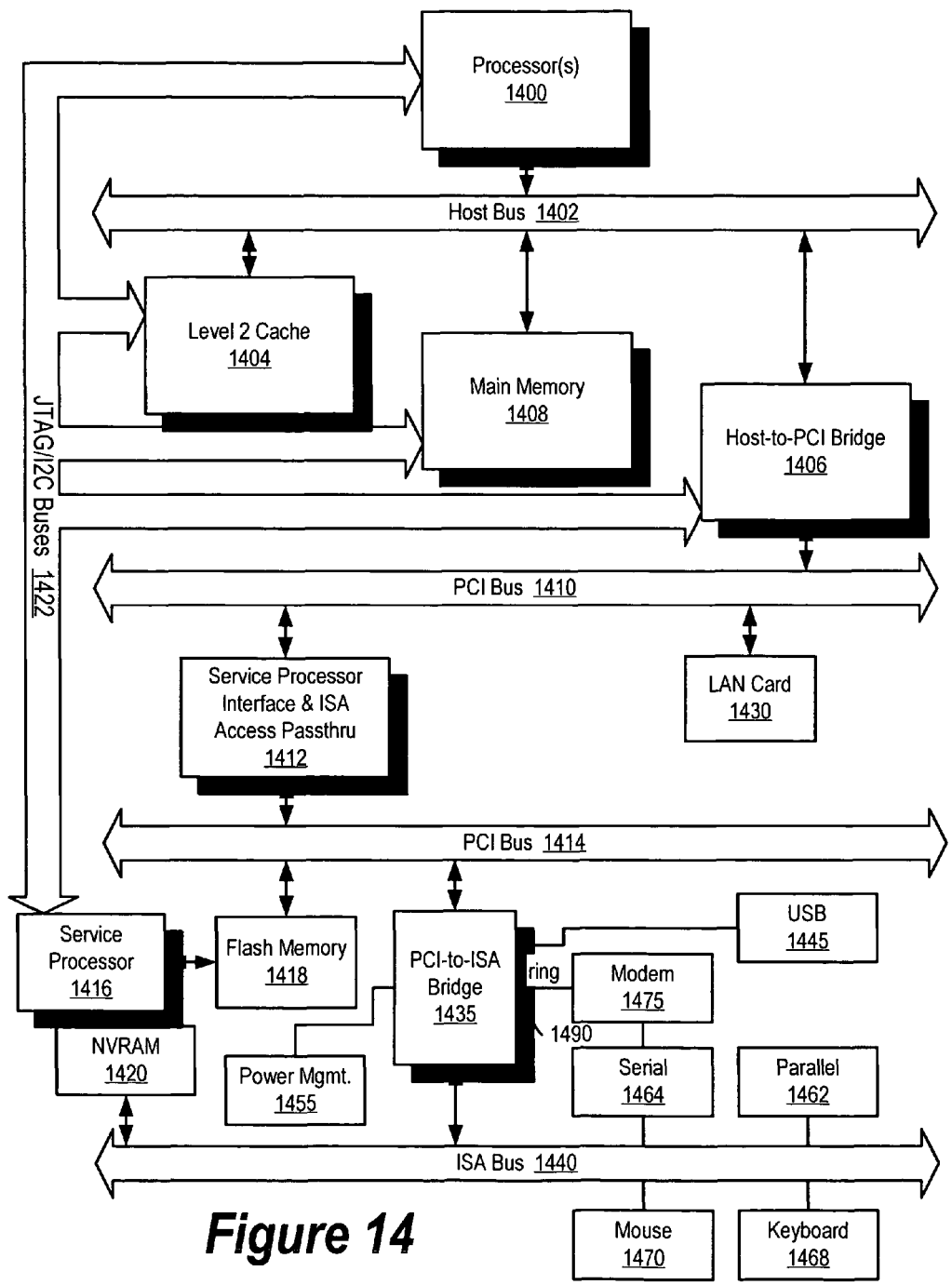
FIG. 14 is a block diagram of a computing device capable of implementing the present invention.

FIG. 14 illustrates information handling system 1401 which is a simplified example of a computer system capable of performing the computing operations described herein. Computer system 1401 includes processor 1400 which is coupled to host bus 1402. A level two (L2) cache memory 1404 is also coupled to host bus 1402. Host-to-PCI bridge 1406 is coupled to main memory 1408, includes cache memory and main memory control functions, and provides bus control to handle transfers among PCI bus 1410, processor 1400, L2 cache 1404, main memory 1408, and host bus 1402. Main memory 1408 is coupled to Host-to-PCI bridge 1406 as well as host bus 1402. Devices used solely by host processor(s) 1400, such as LAN card 1430, are coupled to PCI bus 1410. Service Processor Interface and ISA Access Pass-through 1412 provides an interface between PCI bus 1410 and PCI bus 1414. In this manner, PCI bus 1414 is insulated from PCI bus 1410. Devices, such as flash memory 1418, are coupled to PCI bus 1414. In one implementation, flash memory 1418 includes BIOS code that incorporates the necessary processor executable code for a variety of low-level system functions and system boot functions.

PCI bus 1414 provides an interface for a variety of devices that are shared by host processor(s) 1400 and Service Processor 1416 including, for example, flash memory 1418. PCI-to-ISA bridge 1435 provides bus control to handle transfers between PCI bus 1414 and ISA bus 1440, universal serial bus (USB) functionality 1445, power management functionality 1455, and can include other functional elements not shown, such as a real-time clock (RTC), DMA control, interrupt support, and system management bus support. Nonvolatile RAM 1420 is attached to ISA Bus 1440. Service Processor 1416 includes JTAG and I2C buses 1422 for communication with processor(s) 1400 during initialization steps. JTAG/I2C buses 1422 are also coupled to L2 cache 1404, Host-to-PCI bridge 1406, and main memory 1408 providing a communications path between the processor, the Service Processor, the L2 cache, the Host-to-PCI bridge, and the main memory. Service Processor 1416 also has access to system power resources for powering down information handling device 1401.

Peripheral devices and input/output (I/O) devices can be attached to various interfaces (e.g., parallel interface 1462, serial interface 1464, keyboard interface 1468, and mouse interface 1470 coupled to ISA bus 1440. Alternatively, many I/O devices can be accommodated by a super I/O controller (not shown) attached to ISA bus 1440.

In order to attach computer system 1401 to another computer system to copy files over a network, LAN card 1430 is coupled to PCI bus 1410. Similarly, to connect computer system 1401 to an ISP to connect to the Internet using a telephone line connection, modem 1475 is connected to serial port 1464 and PCI-to-ISA Bridge 1435.

While the computer system described in FIG. 14 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   identifying a loop containing statements that operate over an array of values, wherein each statement includes one or more operations and at least one of the statements includes a plurality of the operations;
   transforming the operations into a set of virtual vector operations;
   individually selecting an expansion for each of the virtual vector operations, wherein the selection is based upon a cost model and the expansion associated with each of the virtual vector operations materializes as one or more distinct expansions chosen from a plurality of possible expansions; and
   expanding each of the virtual vector operations into a native code implementation in accordance with each of the virtual vector operations' individually selected expansion, wherein at least one of the virtual vector operations is expanded into a plurality of distinctly different expansions.

2. The method of claim 1, wherein the plurality of possible expansions includes expanding one of the operations into vector instructions.

3. The method of claim 2, wherein the vector instructions are single-instruction multiple-datapath (SIMD) instructions.

4. The method of claim 2, wherein the plurality of possible expansions includes expanding one of the operations into scalar instructions.

5. The method of claim 4, wherein the plurality of possible expansions includes at least one of inserting a call to a pre-defined library function and expanding one of the operations into a combination of vector and scalar operations.

6. The method of claim 1, wherein the cost model is computed based on at least one of hardware resource availability, data dependencies, and existence of pre-defined library functions for particular operations.

7. A computer-implemented method comprising:
identifying a loop containing statements that operate over an array of values, wherein at least one of the statements includes a first operation and a second operation;
transforming the first operation into a first virtual vector operation and transforming the second operation into a second virtual vector operation;
selecting a first expansion for the first virtual vector operation based upon a cost model;
selecting a plurality of second expansions for the second virtual vector operation based upon the cost model, wherein the second expansion is different than the first expansion;
expanding the first virtual vector operation into a native code implementation in accordance with the first expansion; and
expanding the second virtual vector operation into a plurality of different native code implementations in accordance with the plurality of second expansions.

8. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
identifying a loop containing statements that operate over an array of values, wherein each statement includes one or more operations and at least one of the statements includes a plurality of the operations;
transforming the operations into a set of virtual vector operations;
individually selecting an expansion for each of the virtual vector operations, wherein the selection is based upon a cost model and the expansion associated with each of the virtual vector operations materializes as one or more distinct expansions chosen from a plurality of possible expansions; and
expanding each of the virtual vector operations into a native code implementation in accordance with each of the virtual vector operations' individually selected expansion, wherein at least one of the virtual vector operations is expanded into a plurality of distinctly different expansions.

9. The information handling system of claim 8, wherein the plurality of possible expansions includes expanding one of the operations into vector instructions.

10. The information handling system of claim 9, wherein the vector instructions are single-instruction multiple-datapath (SIMD) instructions.

11. The information handling system of claim 9, wherein the plurality of possible expansions includes expanding one of the operations into scalar instructions.

12. The information handling system of claim 11, wherein the plurality of possible expansions includes at least one of inserting a call to a pre-defined library function and expanding one of the operations into a combination of vector and scalar operations.

13. The information handling system of claim 8, wherein the cost model is computed based on at least one of hardware resource availability, data dependencies, and existence of pre-defined library functions for particular operations.

14. A computer program product stored in a computer readable memory, comprising functional descriptive material that, when executed by an information handling system, causes the information handling system to perform actions that include:
identifying a loop containing statements that operate over an array of values, wherein each statement includes one or more operations and at least one of the statements includes a plurality of the operations;
transforming the operations into a set of virtual vector operations;
individually selecting an expansion for each of the virtual vector operations, wherein the selection is based upon a cost model and the expansion associated with each of the virtual vector operations materializes as one or more distinct expansions chosen from a plurality of possible expansions; and
expanding each of the virtual vector operations into a native code implementation in accordance with each of the virtual vector operations' individually selected expansion, wherein at least one of the virtual vector operations is expanded into a plurality of distinctly different expansions.

15. The computer program product of claim 14, wherein the plurality of possible expansions includes expanding one of the operations into vector instructions.

16. The computer program product of claim 15, wherein the vector instructions are single-instruction multiple-datapath (SIMD) instructions.

17. The computer program product of claim 15, wherein the plurality of possible expansions includes expanding one of the operations into scalar instructions.

18. The computer program product of claim 17, wherein the plurality of possible expansions includes at least one of inserting a call to a pre-defined library function and expanding one of the operations into a combination of vector and scalar operations.

19. The computer program product of claim 14, wherein the cost model is computed based on at least one of hardware resource availability, data dependencies, and existence of pre-defined library functions for particular operations.

* * * * *